UNITED STATES PATENT OFFICE.

FIRMAN THOMPSON, OF NEWARK, DELAWARE.

PROCESS OF OBTAINING POTASH SALTS FROM FELDSPAR.

995,105.  Specification of Letters Patent. Patented June 13, 1911.

No Drawing.  Application filed February 14, 1911. Serial No. 608,610.

*To all whom it may concern:*

Be it known that I, FIRMAN THOMPSON, a citizen of the United States, residing at Newark, in the county of Newcastle and State of Delaware, have invented certain new and useful Improvements in Processes of Obtaining Potash from Feldspar, of which the following is a specification.

This invention relates to the production of potash, and has particular reference to the recovery of potash from feldspar rock.

In the practice of my process in its preferred form, feldspar rock is first ground to pass through a one hundred mesh sieve. The powdered rock is then mixed with an alkali metal acid sulfate and an alkali metal chlorid, preferably sodium acid sulfate and sodium chlorid, the materials being preferably mixed in the following proportions:

Feldspar rock _____ 5 parts by weight
Sodium acid sulfate ____ " " " "
Sodium chlorid _____ 1.8 " " "

I have found that my process can be successfully carried out by using potassium acid sulfate and potassium chlorid in place of sodium acid sulfate and sodium chlorid. I have also found that, while the proportions given have generally yielded the best results in that practically all of the chlorid is removed and the acid sulfate practically all converted into the normal sulfate, these proportions may be widely varied.

The mixture produced as specified is heated for from one to two hours at a bright red heat, becoming thereby partially fused. The mass is then allowed to cool, ground again and leached with water, which removes a mixture of sulfates of sodium and potassium. These salts are then separated by crystallization.

The reactions which take place in the practice of the process are believed to be as follows:—(*a*) The sodium acid sulfate reacts with the sodium chlorid to produce hydrochloric acid gas and normal sodium sulfate. (*b*) The hydrochloric acid gas at the high temperature employed reacts on the feldspar, producing potassium chlorid. (*c*) The potassium chlorid is in turn acted upon by more of the acid sodium sulfate, producing hydrochloric acid gas and potassium sulfate.

No rigid formula can be given to the potash feldspars and it is not possible to write exact chemical equations for the reactions which occur. The reactions which are believed to take place where the reagents specified, are used, can, however, be generally represented as follows:—

Potash feldspar$+$NaCl$=$
$\quad\quad\quad\quad\quad\quad$Soda feldspar$+$KCl
$2KCl+2NaHSO_4=K_2SO_4+Na_2SO_4+2HCl$
$NaHSO_4+$excess of $NaCl=Na_2SO_4+HCl$.

The yield of potash is ordinarily from 80 to 90 per cent. of the potash in the rock. For the best results it seems that the temperature must be controlled within rather narrow limits.

While I have described the preferred reagents and proportions employed in my process, it is to be understod that chemical equivalents of such reagents may be employed and the proportions in which they are brought together, widely varied, within the spirit of my invention and without departing from the scope of the appended claims.

Having thus described my invention, I claim:—

1. The herein described process of recovering potash from feldspar rock, which consists in reducing the rock to powdered form, mixing therewith an alkali metal acid sulfate and an alkali metal chlorid, heating the mixture, and separating the soluble portion from the remaining portion of the mixture.

2. The herein described process of recovering potash from feldspar rock, which consists in reducing the rock to powdered form, mixing therewith an alkali metal acid sulfate and an alkali metal chlorid, heating the mixture to a bright red heat, cooling the mixture, reducing it to powdered form, and leaching with water.

3. The herein described process of recovering potash from feldspar rock, which consists in reducing the rock to powdered form, mixing therewith an alkali metal acid sulfate and an alkali metal chlorid in the approximate proportions of five parts of the feldspar rock, five parts of the alkali metal acid sulfate, and one and eight tenths parts of the alkali metal chlorid, heating the mixture to a bright red heat, allowing the mass to cool, reducing the mass to powder, and leaching with water.

4. The herein described process of recovering potash from feldspar rock, which consists in reducing the rock to powdered form, mixing therewith an alkali metal acid sulfate and an alkali metal chlorid, heating the mixture, leaching with water to remove the resulting potassium sulfate and sodium sulfate, and separating the potassium sulfate and sodium sulfate.

5. The herein described process of recovering potash from feldspar rock, which consists in reducing the rock to powdered form, mixing therewith an alkali metal acid sulfate and an alkali metal chlorid, heating the mixture, leaching the same with water to remove the resulting potassium sulfate and sodium sulfate from the mass, and separating the potassium sulfate from the sodium sulfate.

6. The herein described process of recovering potash from feldspar rock, which consists in reducing the rock to powdered form, mixing therewith sodium acid sulfate and sodium chlorid, heating the mixture, and leaching with water.

7. The herein described process of recovering potash from feldspar rock, which consists in reducing the rock to powdered form, mixing therewith sodium acid sulfate and sodium chlorid, heating the mixture, cooling the mixture, reducing the same to powdered form, and leaching with water.

8. The herein described process of recovering potash from feldspar rock, which consists in reducing the rock to powdered form, mixing therewith sodium acid sulfate and sodium chlorid, heating the mixture, leaching the same with water, and separating the potassium sulfate from the sodium sulfate in the resulting solution.

9. The herein described process of recovering potash from feldspar rock, which consists in reducing the rock to powdered form, mixing therewith sodium acid sulfate and sodium chlorid, heating the mixture to a bright red heat for from one to two hours, and leaching the same with water.

In testimony whereof I affix my signature in presence of two witnesses.

FIRMAN THOMPSON.

Witnesses:
H. H. MORGAN, Jr.,
H. P. BASSETT.